R. FREYGANG.
APPARATUS FOR WASHING OR EXTRACTING MINERALS.
APPLICATION FILED JAN. 6, 1908.
910,279.
Patented Jan. 19, 1909.
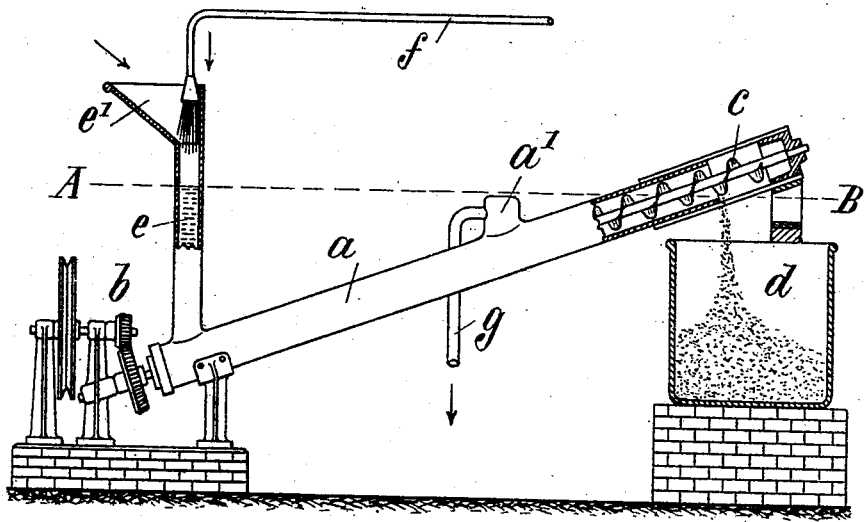
Witnesses.
Inventor.

UNITED STATES PATENT OFFICE.

REINHOLD FREYGANG, OF HAMBURG, GERMANY.

APPARATUS FOR WASHING OR EXTRACTING MINERALS.

No. 910,279.   Specification of Letters Patent.   Patented Jan. 19, 1909.

Application filed January 6, 1908. Serial No. 409,546.

*To all whom it may concern:*

Be it known that I, REINHOLD FREYGANG, a citizen and resident of Hamburg, Germany, have invented certain new and useful Improvements in Apparatus for Washing or Extracting Minerals, of which the following is a specification.

The present invention relates to improvements in apparatus for washing or extracting minerals.

There are auriferous and argentiferous minerals which consist of a mixture of quartz and clay, with a subsidiary proportion of iron and copper. Now the clay in this mixture greatly impedes the extraction of the precious metals when this is effected in the almost universal way by lixiviating the ore by means of a solution of cyanid of potassium, as the clay renders it very difficult for the liquid to reach the particles of ore, so that when the cyanid process is applied to metallic ores containing clay a considerable proportion of the metal remains undissolved in the ore. In addition to this, the clay very speedily clogs the filter bottoms and pumps which it is necessary to employ in the cyanid process.

The present invention has for its object an apparatus by means of which it is possible with a special method of washing utilizing but little water, to free the ore from clay and other light mineral admixtures and to extract the quartz sand containing the precious metals. The cyanid solution is then able to permeate this sand completely when the latter constitutes the stationary bottom stratum in a collector vessel and the liquid thus extracts the metal contained in the smallest particles of mineral.

The novel apparatus consists broadly of an inclined worm surrounded by a tube and to which the ore and water are supplied at the lower end. Apparatus of this kind is well known and particularly for washing coal, and also for washing minerals and earths; in accordance with the present invention, however, the worm is also provided in proximity to its upper end, with an upwardly directed discharge pipe, so that the minerals are raised by the worm, and the water which is simultaneously supplied below, carries all the lighter mineral particles with it in passing out through the upper discharge pipe, while the heavier particles of mineral are carried by the worm to the end of its inclosing tube and discharged into a collector vessel. In using the apparatus for auriferous sand containing clay, the clay will be removed by the water and carried through the discharge pipe, while the heavy auriferous quartz sand remains in the worm until discharged by it into the tank containing the cyanid solution and provided with a discharge cock. As the auriferous mineral is freed from clay in the worm, in the cyanid tank it forms a thoroughly porous stratum completely permeable by the cyanid solution which is able to act upon the smallest particles of mineral.

In order that my invention may be more fully understood by one skilled in the art to which it appertains I shall now proceed to describe the same in detail and for that purpose shall refer to the accompanying sheet of drawing in which I have shown by way of example a longitudinal elevation, partly in section, of an apparatus constructed in accordance with and embodying my invention.

The apparatus comprises an inclined cylindrical tube $a$ containing a conveyer worm $c$ adapted to be rotated by a suitable driving means $b$. The tube $a$ is closed at its lower end; its upper end is open and below it a suitable vessel $d$ is arranged. In proximity to the lower end of the tube $a$ another tube $e$ directed vertically upwards is provided and ends above in a hopper $e^1$ through which the finely ground metalliferous ore is supplied, water entering the hopper through a suitable supply pipe $f$. The tube $e$ acts as a standpipe to maintain the head of water. Immediately below the horizontal plane A—B passing through the lower edge of the upper end of the inclined tube $a$, a dome-like projection $a^1$ from this tube ends; this dome $a^1$ is provided with a discharge pipe $g$ which may have a slight siphoning action.

The apparatus is employed and operates in the following manner:—Water is continuously supplied to the apparatus through the supply pipe $f$, and through the hopper $e^1$ ore in a finely ground or loose pulverulent condition is supplied in such quantities as the worm $c$ driven at an appropriate and not excessive speed is able to deal with. Now as the minerals mixed intimately with the water are conveyed upwards by the worm, the water enters the dome $a^1$ on the inclined tube $a$ and flows out through the discharge pipe $g$, carrying with it all the light mineral particles and especially the clay, so that only the heavy metalliferous quartz sand reaches the end of the said tube, the water, however, raised with the quartz sand, as soon as the mineral mixed with it is raised by the worm above the water level A—B, again flows downwards, so that the sand reaches the vessel $d$ in only a slightly wet condition. The flow of water from the supply pipe $f$ is regulated in such a manner that the water level remains constant, that is to say, it invariably lies somewhat above the discharge dome $a^1$.

The vessel $d$ may contain the cyanid solution, which in this case is discharged from time to time at the lower part of the vessel by suitable means not shown in the drawing, the stratum of mineral serving as a filter; or this vessel may serve only for collecting the washed ore. An arrangement may also be adopted in accordance with which the metalliferous sand falls from the worm directly into the tube of a second worm to which tube cyanid solution is supplied in place of water; or in other words the apparatus may be duplicated so that one will discharge into the other. The lixiviation of the metal is then effected during the upward displacement of the ore by the worm in this second apparatus, and the solution containing the dissolved cyanid gold is then discharged from the dome of this second worm apparatus, while if necessary the sand issuing at the top of the second lixiviating worm apparatus may be carried one or more additional and similar lixiviating worm apparatus. Again, ores containing little or no clay may be supplied together with the cyanid lye directly to the inclined tube $a$ of the first worm, so that the cyanid solution issues from the discharge pipe $g$ of the dome $a^1$. Experiments have demonstrated that say an auriferous ore containing 31% of clay, after treatment in an improved worm apparatus having a length of two meters, presents only 3% of this admixture; while ore in its natural condition subjected to the cyanid process yielded only from 35 to 50% of the gold contained in it, almost the whole of the gold contained in the same was obtained in solution by treatment in accordance with the present invention.

The apparatus is not only applicable to washing auriferous ores, but is also generally applicable to the treatment of minerals of mixed composition in some cases the particles of mineral issuing from the tube $c$ with the water may be those that it is desired to extract, say in the case of ochre which is obtained mixed with sand and the like.

I claim:

1. In an ore washer the combination with an inclined elongated washing conduit open at its upper discharge end; of conveying means in the conduit adapted to gently agitate the pulp passing through the conduit; means for feeding the material mixed with a liquid to the lower end of the conduit and means intermediate the feed and discharge points connecting with the upper portion of the conduit adapted to discharge substantially all the liquid therefrom with sufficient impetus to carry slimes therewith.

2. In an ore washer the combination with an inclined, elongated washing conduit open at its upper, discharge end; of conveying means therein adapted to gently agitate the pulp passing through the conduit; means for feeding the material mixed with a liquid to the lower end of the conduit; means for maintaining a hydraulic head in the conduit, means intermediate the feed and discharge points, connecting with the upper portion of the conduit adapted to discharge substantially all of the liquid therefrom with sufficient impetus to carry slimes therewith.

3. In an ore washer the combination with an inclined, elongated conduit open at its upper discharge end; of conveying means therein adapted to gently agitate the pulp passing through the conduit; means for feeding the material mixed with liquid to the lower end of the conduit; means having a siphoning action and intermediate the feed and discharge points, connected with the upper portion of the conduit and adapted to discharge substantially all of the liquid therefrom with sufficient impetus to carry slimes.

4. In an ore washer the combination with an inclined, elongated conduit open at its upper, discharge end, conveying means therein adapted to agitate the pulp passing through the conduit; of means for feeding the material mixed with water to the lower end of said conduit and for maintaining a hydraulic head at the feed point, means intermediate the feed and discharge points and connected to the conduit above its bottom adapted to discharge substantially all the water therefrom and including means to produce a siphoning action during the discharge.

5. In an ore washer the combination with an inclined tube, having a discharge opening at its upper end; of a conveyer screw therein, a substantially vertical supply pipe connected to the lower end of the tube and extending above the liquid level of the apparatus, a dome connected to the upper portion of the tube intermediate its ends and a discharge pipe extending downwardly from the dome.

REINHOLD FREYGANG.

Witnesses:
Max F. A. Kaempff,
Ernest H. L. Mummenhoff.